(12) United States Patent
Eggimann (10) Patent No.: US 8,087,305 B2
(45) Date of Patent: Jan. 3, 2012

(54) SYSTEM INCLUDING A MAGNET AND FIRST AND SECOND CONCENTRATORS

(75) Inventor: Christoph Eggimann, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 193 days.

(21) Appl. No.: 12/466,520

(22) Filed: May 15, 2009

(65) Prior Publication Data

US 2010/0289485 A1 Nov. 18, 2010

(51) Int. Cl.
*G01L 3/02* (2006.01)
(52) U.S. Cl. .................................. 73/862.333
(58) Field of Classification Search ............. 73/862.331–862.333
See application file for complete search history.

(56) References Cited

U.S. PATENT DOCUMENTS

| | | | |
|---|---|---|---|
| 3,601,921 A * | 8/1971 | Strohmaier | 446/92 |
| 4,874,053 A * | 10/1989 | Kimura et al. | 180/443 |
| 5,705,756 A | 1/1998 | LeMarquandet et al. | |
| 5,930,905 A | 8/1999 | Zabler et al. | |
| 7,028,545 B2 | 4/2006 | Gandel et al. | |
| 7,051,602 B2 | 5/2006 | Nakane et al. | |
| 7,191,669 B2 | 3/2007 | Nakane et al. | |
| 7,246,531 B2 | 7/2007 | Nakane et al. | |
| 7,845,943 B2 * | 12/2010 | Meitner | 433/75 |
| 2002/0067160 A1 * | 6/2002 | Oomkes | 324/207.2 |

OTHER PUBLICATIONS

"Development of a Contactless Hall Effect Torque Sensor for Electric Power Steering", Didier Angleviel, et al., SAE International, 2005 (8 pgs.).

* cited by examiner

*Primary Examiner* — Max Noori
(74) *Attorney, Agent, or Firm* — Dicke, Billig & Czaja, PLLC (57) ABSTRACT

A system including a first concentrator, a second concentrator, and a magnet. The first concentrator has a first partial hub. The second concentrator has a second partial hub aligned with the first partial hub to form a bore. The magnet is situated in the bore and the first concentrator and the second concentrator guide magnetic flux from the magnet to sense movement of the magnet relative to the first concentrator and the second concentrator.

22 Claims, 6 Drawing Sheets

SYSTEM INCLUDING A MAGNET AND FIRST AND SECOND CONCENTRATORS

BACKGROUND

Often, it is useful to measure the angular displacement and/or torque between two members, such as two rotating shafts. One shaft rotates relative to the other shaft and a sensor, such as a torque sensor, detects the angular displacement and/or torque between the two shafts. Also, it is often useful to measure the absolute angle of rotation of a rotating shaft, where the shaft rotates and an angle sensor detects the angle of the shaft relative to a stationary point. These measurements are useful in systems, such as power steering systems in trucks and automobiles.

Typically, in power steering systems, a first shaft is connected to a steering wheel and a second shaft is connected to a steering mechanism. The first shaft is connected to the second shaft via a compliant member, such as a torsion bar. The driver turns the steering wheel, which rotates the first shaft a number of degrees with respect to the second shaft. A torque sensor senses the angular displacement of the first shaft relative to the second shaft and provides an output indicating the torque applied to the first shaft, the torsion bar, and the second shaft. The amount of power steering assist is determined as a function of the applied torque. A separate angle sensor senses and outputs the angle of rotation of the first shaft or the second shaft.

These systems can be magnetic based systems, contact based systems that use, for example, resistive tracks and wipers, inductive systems, or optical systems. In some magnetic based systems, the torque sensor and the angle sensor are separate sensors. Where, the torque sensor includes materials, such as multiple magnets, and the angle sensor includes materials, such as one or more magnets. Multiple magnets and separate sensors increase the cost and complexity of the system.

For these and other reasons there is a need for the present invention.

SUMMARY

One embodiment described in the disclosure provides a system including a first concentrator, a second concentrator, and a magnet. The first concentrator has a first partial hub. The second concentrator has a second partial hub aligned with the first partial hub to form a bore. The magnet is situated in the bore and the first concentrator and the second concentrator guide magnetic flux from the magnet to sense movement of the magnet relative to the first concentrator and the second concentrator.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
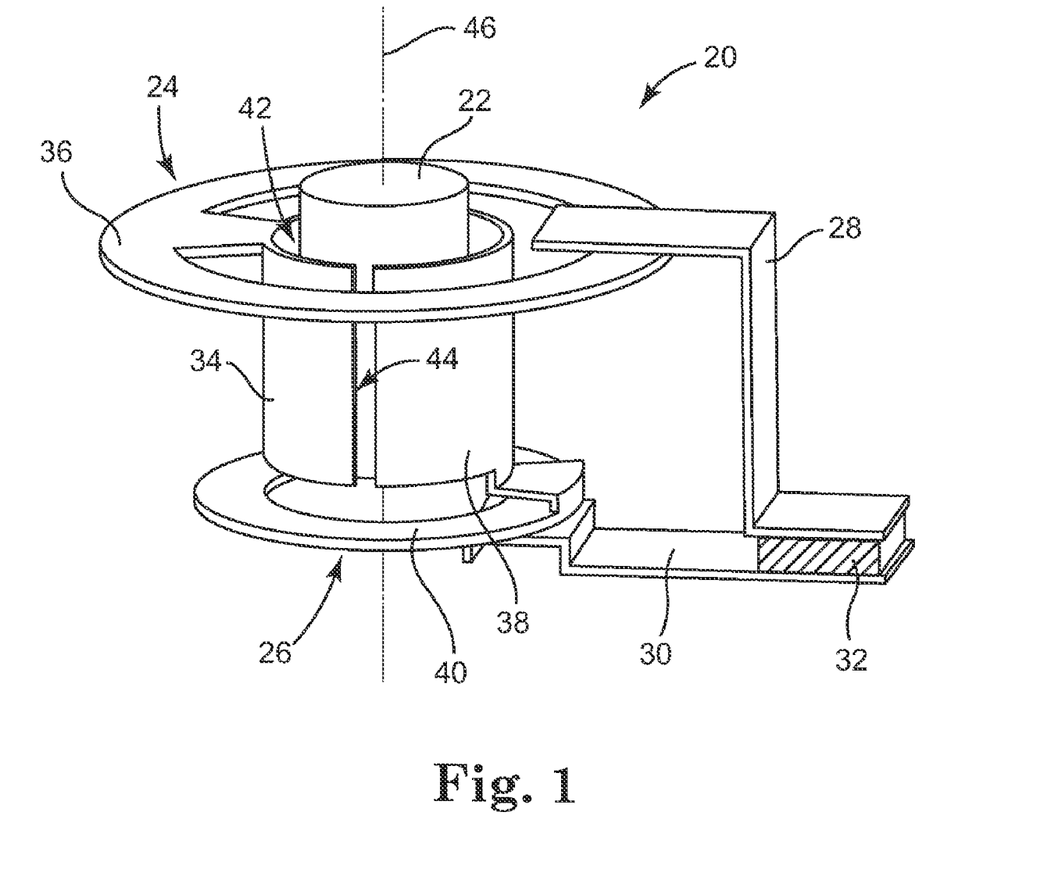
FIG. 1 is a diagram illustrating one embodiment of a sensor system.

FIG. 1 is a diagram illustrating one embodiment of a sensor system 20 that is a torque sensor including a single magnet 22. Sensor system 20 senses and measures the torque between two members, such as two rotating shafts. In one embodiment, sensor system 20 is used in a power steering system. In one embodiment, sensor system 20 senses the angular displacement of a first shaft relative to a second shaft that is connected to the first shaft via a torsion bar, and sensor system 20 provides an output indicating the torque applied to the first shaft, the torsion bar, and the second shaft.

Sensor system 20 includes magnet 22, a first magnetic flux concentrator 24, a second magnetic flux concentrator 26, a first magnetic flux guide 28, a second magnetic flux guide 30, and a magnetic sensing element 32. Magnet 22 provides magnetic flux that flows through first concentrator 24 and second concentrator 26 and through first guide 28 and second guide 30. Magnetic sensing element 32 senses magnetic flux flowing between first guide 28 and second guide 30 to measure movement of magnet 22 relative to first concentrator 24 and second concentrator 26.

First concentrator 24 has a first partial hub 34 and a first circular flange 36. First partial hub 34 is connected to first circular flange 36 along at least part of one edge of first partial hub 34. First concentrator 24 is made of a magnetically conductive material having a high permeability. In one embodiment, first concentrator 24 is made of a ferromagnetic material. In one embodiment, first partial hub 34 is substantially semicircular. In one embodiment, first partial hub 34 is connected to first circular flange 36 continuously along the entire edge of first partial hub 34.

Second concentrator 26 has a second partial hub 38 and a second circular flange 40. Second partial hub 38 is connected to second circular flange 40 along at least part of one edge of second partial hub 38. Second concentrator 26 is made of a magnetically conductive material having a high permeability. In one embodiment, second concentrator 26 is made of a ferromagnetic material. In one embodiment, second partial hub 38 is substantially semicircular. In one embodiment, second partial hub 38 is connected to second circular flange 40 continuously along the entire edge of second partial hub 38.

First concentrator 24 and second concentrator 26 are aligned to form a central bore 42, where first partial hub 34 and second partial hub 38 are spaced apart at 44 and circumferentially aligned to form bore 42.

Magnet 22 is a permanent magnet that is situated in bore 42. In one embodiment, magnet 22 is a cylindrical magnet having an axis at 46 that is aligned with the axis at 46 of bore 42. In one embodiment, magnet 22 is a diametrically magnetized cylindrical magnet having an axis at 46 that is aligned with the axis at 46 of bore 42, where the diametrically magnetized cylindrical magnet is magnetized perpendicular to length, so the north and south poles are located on the sides of the cylinder. In one embodiment, magnet 22 is a single pole magnet.

In one embodiment, magnet 22 is coupled to a first member and rotates in response to movement of the first member, and first concentrator 24 and second concentrator 26 are coupled to a second member and rotate in response to movement of the second member. In one embodiment, magnet 22 is coupled to a first shaft, and first concentrator 24 and second concentrator 26 are coupled to a second shaft that is connected to the first shaft via a torsion bar, where system 20 senses torque between the first shaft and the second shaft. In one embodiment, magnet 22 is coupled to a first shaft via a first gear, and first concentrator 24 and second concentrator 26 are coupled to a second shaft via a second gear.

First guide 28 is situated adjacent first circular flange 36, and second guide 30 is situated adjacent second circular flange 40. In one embodiment, first guide 28 is situated adjacent first circular flange 36 with a small gap between first guide 28 and first circular flange 36, and second guide 30 is situated adjacent second circular flange 40 with a small gap between second guide 30 and second circular flange 40. In one embodiment, first guide 28 is situated adjacent first circular flange 36 with no gap between first guide 28 and first circular flange 36, and second guide 30 is situated adjacent second circular flange 40 with no gap between second guide 30 and second circular flange 40.

First guide 28 overlaps first circular flange 36, and second guide 30 overlaps second circular flange 40. In one embodiment, first guide 28 is semicircular and has a semicircular overlap area with first circular flange 36, and second guide 30 is semicircular and has a semicircular overlap area with second circular flange 40.

Each of the first and second guides 28 and 30 is made of a magnetically conductive material having a high permeability. In one embodiment, first guide 28 is made of a ferromagnetic material. In one embodiment, second guide 30 is made of a ferromagnetic material.

Magnetic sensing element 32 is situated between first guide 28 and second guide 30. Magnetic sensing element 32 senses and measures magnetic flux flowing between first guide 28 and second guide 30. In one embodiment, magnetic sensing element 32 includes one or more Hall effect sensing elements.

In operation, magnet 22 provides magnetic flux that flows through first concentrator 24 and second concentrator 26. The magnetic flux flows through first partial hub 34 and first circular flange 36 and the magnetic flux flows through second partial hub 38 and second circular flange 40. Also, the magnetic flux flows through first guide 28 and second guide 30 via first concentrator 24 and second concentrator 26. The amount of magnetic flux flowing between first guide 28 and second guide 30 is a function of the movement and position of magnet 22 relative to first concentrator 24 and second concentrator 26. Magnetic sensing element 32 senses and measures magnetic flux flowing between first guide 28 and second guide 30 to determine the relative angle between magnet 22 and the first and second concentrators 24 and 26.

In one embodiment, sensor system 20 includes an angle sensor situated adjacent one end of magnet 22. The angle sensor senses and measures the angle of rotation of magnet 22 relative to a fixed point. In this embodiment, sensor system 20 measures both torque and the angle of rotation via the combined torque and angle sensor system, which uses a single magnet 22. Using a single magnet 22 reduces the cost and complexity of the system.

In one embodiment, sensor system 20 includes a second magnet mechanically coupled to first concentrator 24 and second concentrator 26. A first angle sensor is situated adjacent one end of magnet 22 to measure the angle of rotation of magnet 22 and a second angle sensor is situated adjacent the second magnet to measure the angle of rotation of first concentrator 24 and second concentrator 26. The difference between the angles as measured by the first angle sensor and the second angle sensor can be used as a measure of angular displacement and another measure of torque.

Figure 2:
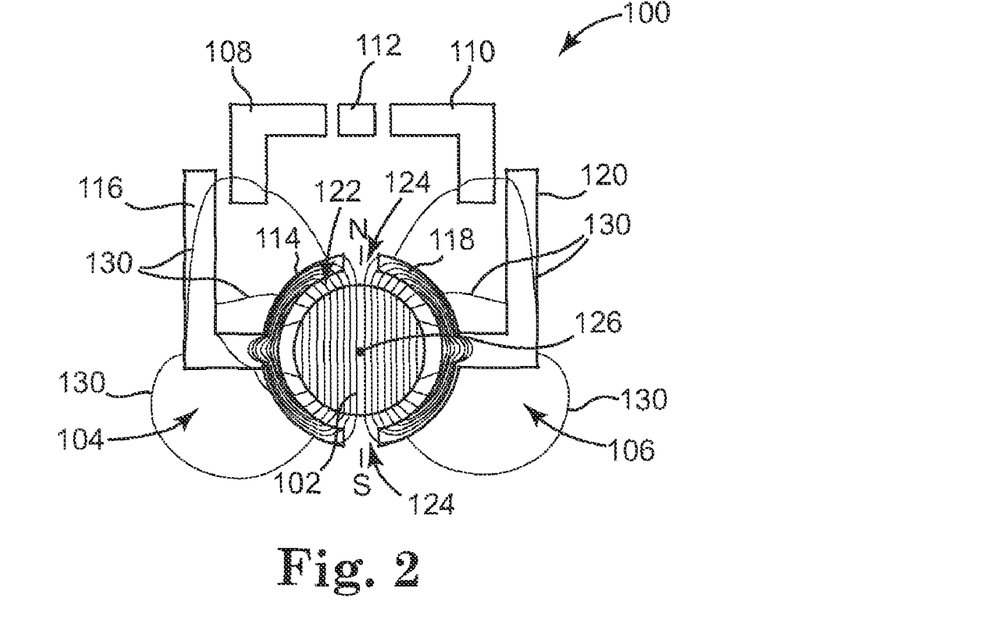
FIG. 2 is a diagram illustrating a sensor system with a magnet in a centered north/south position.
Figure 3:
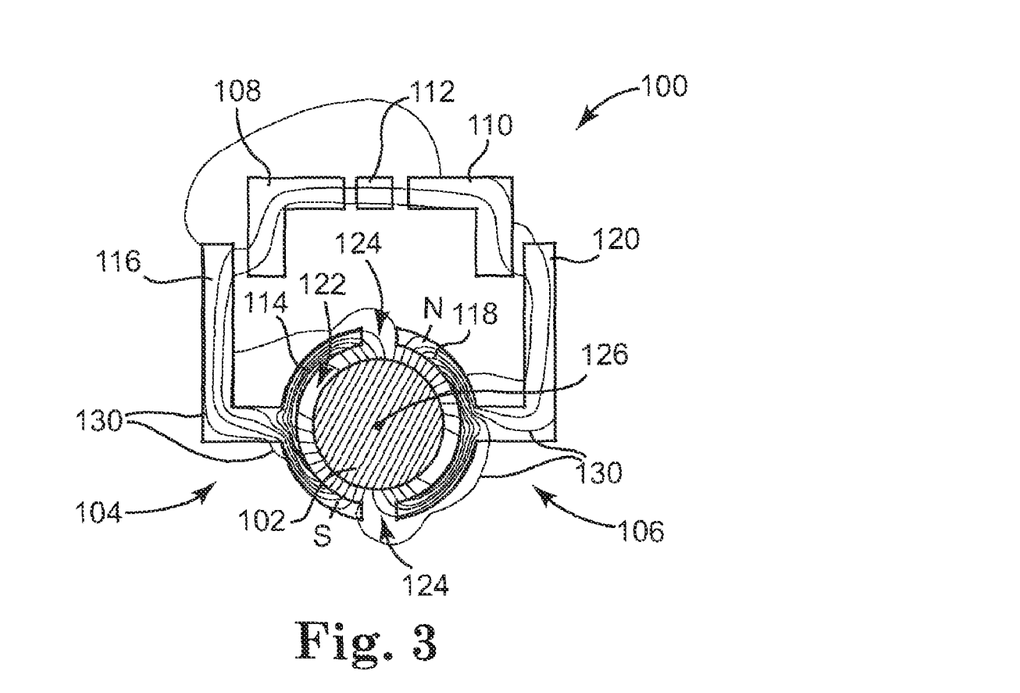
FIG. 3 is a diagram illustrating a sensor system with a magnet rotated clockwise to a non-centered north/south position.

FIGS. 2 and 3 are diagrams illustrating the operation of one embodiment of a sensor system 100 that uses a single magnet 102 to sense and measure angular displacement and/or torque. Sensor system 100 is similar to sensor system 20.

FIG. 2 is a diagram illustrating sensor system 100 with magnet 102 in a centered north/south position. Sensor system 100 includes magnet 102, a first magnetic flux concentrator 104, a second magnetic flux concentrator 106, a first magnetic flux guide 108, a second magnetic flux guide 110, and a magnetic sensing element 112.

First concentrator 104 has a first partial hub 114 and a first flange 116. First partial hub 114 is connected to first flange 116 along at least part of one edge of first partial hub 114. First concentrator 104 is made of a magnetically conductive material having a high permeability. In one embodiment, first concentrator 104 is made of a ferromagnetic material. In one embodiment, first partial hub 114 is substantially semicircular. In one embodiment, first partial hub 114 is connected to first flange 116 continuously along the entire edge of first partial hub 114.

Second concentrator 106 has a second partial hub 118 and a second flange 120. Second partial hub 118 is connected to second flange 120 along at least part of one edge of second partial hub 118. Second concentrator 106 is made of a magnetically conductive material having a high permeability. In one embodiment, second concentrator 106 is made of a ferromagnetic material. In one embodiment, second partial hub 118 is substantially semicircular. In one embodiment, second partial hub 118 is connected to second flange 120 continuously along the entire edge of second partial hub 118.

First concentrator 104 and second concentrator 106 are aligned to form the central bore 122, where first partial hub 114 and second partial hub 118 are spaced apart at 124 and circumferentially aligned to form bore 122.

Magnet 102 is a cylindrical permanent magnet situated in bore 122 and having an axis at 126 that is aligned with the axis at 126 of bore 122. Magnet 102 is diametrically magnetized, where the cylindrical magnet 102 is magnetized perpendicular to length, such that the north pole N and the south pole S are located on opposite sides of the cylinder. Magnet 102 is a single pole magnet. In other embodiments, the north pole N and south pole S can be switched.

First guide 108 is situated adjacent first flange 116, and second guide 110 is situated adjacent second flange 120. Each of the first and second guides 108 and 110 is made of a magnetically conductive material having a high permeability. In one embodiment, first guide 108 is made of a ferromagnetic material. In one embodiment, second guide 110 is made of a ferromagnetic material.

Magnetic sensing element 112 is situated between first guide 108 and second guide 110. Magnetic sensing element 112 senses and measures magnetic flux flowing between first guide 108 and second guide 110. In one embodiment, magnetic sensing element 112 is a Hall effect sensing element.

In operation, magnet 102 provides magnetic flux that flows as indicated via magnetic field lines 130. The magnetic flux flows between the north pole N and the south pole S of magnet 102. First partial hub 114 and second partial hub 118 receive magnetic flux and guide magnetic flux between the north pole N and the south pole S of magnet 102. Also, part of the magnetic flux flows through first partial hub 114, first flange 116, and first guide 108 between the north pole N and the south pole S of magnet 102, and part of the magnetic flux flows through second partial hub 118, second flange 120, and second guide 110 between the north pole N and the south pole S of magnet 102. With magnet 102 in a centered north/south position, little or no magnetic flux flows between first guide 108 and second guide 110 via magnetic sensing element 112, such that magnetic sensing element 112 senses little or no magnetic flux and provides an output that indicates a corresponding measure of angular displacement and/or torque.

FIG. 3 is a diagram illustrating sensor system 100 with magnet 102 rotated clockwise to a non-centered north/south position. In one embodiment, magnet 102 is coupled to a first member and rotates in response to movement of the first member, and first concentrator 104 and second concentrator 106 are coupled to a second member and rotate in response to movement of the second member. In one embodiment, magnet 102 is coupled to a first shaft, and first concentrator 104 and second concentrator 106 are coupled to a second shaft that is connected to the first shaft via a torsion bar, where system 100 senses torque between the first shaft and the second shaft. In one embodiment, magnet 102 is coupled to a first shaft via a first gear, and first concentrator 104 and second concentrator 106 are coupled to a second shaft via a second gear.

In operation, magnet 102 rotates relative to first concentrator 104 and second concentrator 106 and magnet 102 provides magnetic flux that flows through magnetic sensing element 112, between the north pole N and the south pole S of magnet 102. First partial hub 114 and second partial hub 118 receive magnetic flux and guide magnetic flux between the north pole N and the south pole S of magnet 102. Some of the magnetic flux flows through second partial hub 118, second flange 120, and second guide 110 to magnetic sensing element 112 and first guide 108, first flange 116, and first partial hub 114. With magnet 102 in a non-centered north/south position, magnetic flux flows between first guide 108 and second guide 110 via magnetic sensing element 112. Magnetic sensing element 112 senses this magnetic flux and provides an output that indicates a corresponding measure of angular displacement and/or torque of magnet 102 relative to first concentrator 104 and second concentrator 106.

Figure 4:
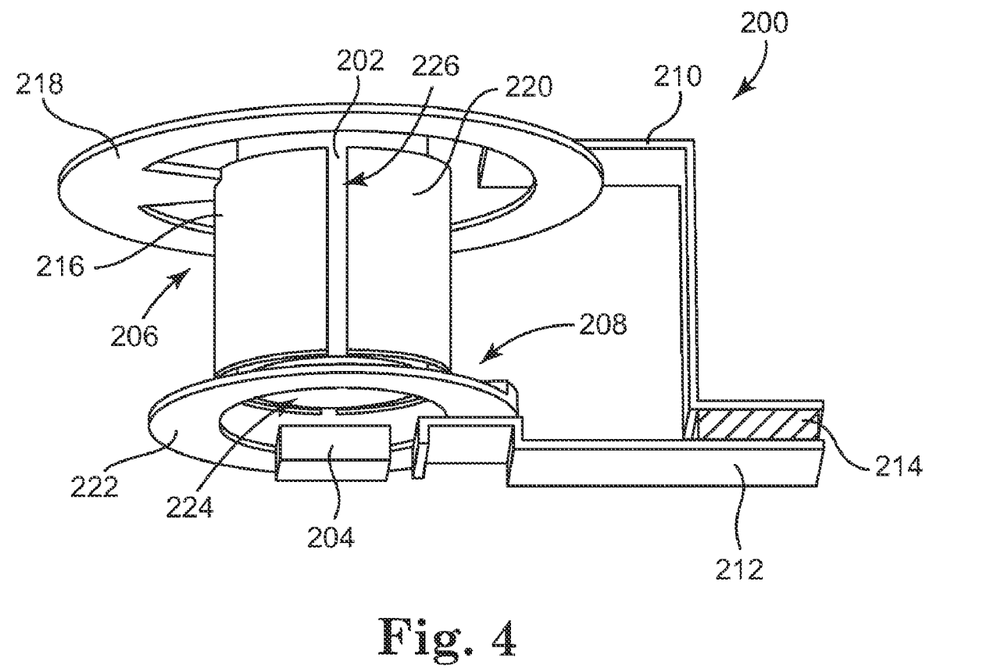
FIG. 4 is diagram illustrating one embodiment of a torque and angle sensor system that uses a single magnet.

FIG. 4 is a diagram illustrating one embodiment of a torque and angle sensor system 200 that uses a single magnet 202. Sensor system 200 measures angular displacement and/or torque, and the angle of rotation of magnet 202. Sensor system 200 includes an angle sensor 204 situated adjacent one end of magnet 202. Angle sensor 204 senses and measures the angle of rotation of magnet 202 relative to a fixed point. Using a single magnet 202 reduces cost and complexity, as compared to using multiple magnets in separate torque and angle measurement systems. In one embodiment, sensor system 200 senses and measures the torque between two members, such as two rotating shafts, and the angle of rotation of one of the two shafts. In one embodiment, angle sensor 204 is a magnetic sensor measuring magnetic flux components perpendicular to magnet 202. In one embodiment, angle sensor 204 is a magnetic sensor based on giant magneto-resistance (GMR).

In one embodiment, sensor system 200 is used in a power steering system. Sensor system 200 senses the angular displacement of a first shaft relative to a second shaft that is connected to the first shaft via a torsion bar. Sensor system 200 also senses the angle of rotation of the first shaft relative to a fixed point. Sensor system 200 provides an output indicating the torque applied to the first shaft, the torsion bar, and the second shaft and an output indicating the angle of rotation of the first shaft. In one embodiment, sensor system 200 senses the angle of rotation of the second shaft.

Sensor system 200 includes magnet 202, angle sensor 204, a first magnetic flux concentrator 206, a second magnetic flux concentrator 208, a first magnetic flux guide 210, a second magnetic flux guide 212, and a magnetic sensing element 214.

First concentrator 206 has a first partial hub 216 and a first circular flange 218 that is connected to first partial hub 216 along at least part of one edge of first partial hub 216. First concentrator 206 is made of a magnetically conductive material having a high permeability. In one embodiment, first concentrator 206 is made of a ferromagnetic material. In one embodiment, first partial hub 216 is substantially semicircular. In one embodiment, first partial hub 216 is connected to first circular flange 218 continuously along the entire edge of first partial hub 216.

Second concentrator 208 has a second partial hub 220 and a second circular flange 222 that is connected to second partial hub 220 along at least part of one edge of second partial hub 220. Second concentrator 208 is made of a magnetically conductive material having a high permeability. In one embodiment, second concentrator 208 is made of a ferromagnetic material. In one embodiment, second partial hub 220 is substantially semicircular. In one embodiment, second partial hub 220 is connected to second circular flange 222 continuously along the entire edge of second partial hub 220.

First concentrator 206 and second concentrator 208 are aligned to form a central bore 224, where first partial hub 216 and second partial hub 220 are spaced apart at 226 and circumferentially aligned to form bore 224.

Magnet 202 is a permanent magnet situated in bore 224. In one embodiment, magnet 202 is a cylindrical magnet having an axis that is aligned with the axis of bore 224. In one embodiment, magnet 202 is a diametrically magnetized cylindrical magnet having an axis that is aligned with the axis of bore 224, where the diametrically magnetized cylindrical magnet is magnetized perpendicular to length, such that the north and south poles are located on the sides of the cylinder. In one embodiment, magnet 202 is a single pole magnet.

In one embodiment, magnet 202 is coupled to a first member and rotates in response to movement of the first member, and first concentrator 206 and second concentrator 210 are coupled to a second member and rotate in response to movement of the second member. In one embodiment, magnet 202 is coupled to a first shaft, and first concentrator 206 and second concentrator 208 are coupled to a second shaft that is connected to the first shaft via a torsion bar, where system 200 senses torque between the first shaft and the second shaft and the angle of rotation of the first shaft. In one embodiment, magnet 202 is coupled to a first shaft via a first gear, and first concentrator 206 and second concentrator 208 are coupled to a second shaft via a second gear.

First guide 210 is situated adjacent first circular flange 218, and second guide 212 is situated adjacent second circular flange 222. Each of the first and second guides 210 and 212 is made of a magnetically conductive material having a high permeability. In one embodiment, first guide 210 is made of a ferromagnetic material. In one embodiment, second guide 212 is made of a ferromagnetic material.

Magnetic sensing element 214 is situated between first guide 210 and second guide 212. Magnetic sensing element 214 senses and measures magnetic flux flowing between first guide 210 and second guide 212. In one embodiment, magnetic sensing element 214 is a Hall effect sensing element.

In operation, magnet 202 rotates and provides magnetic flux that flows through first concentrator 206 and second concentrator 208. The magnetic flux flows through first partial hub 216 and first circular flange 218 and through second partial hub 220 and second circular flange 222. Also, some of the magnetic flux flows through first guide 210 and second guide 212 via first concentrator 206 and second concentrator 208. The amount of magnetic flux flowing between first guide 210 and second guide 212 is a function of the movement and position of magnet 202 relative to first concentrator 206 and second concentrator 208. Magnetic sensing element 214 senses and measures magnetic flux flowing between first guide 210 and second guide 212 to measure angular displacement and torque. Angle sensor 204 senses magnetic flux and measures the angle of rotation of magnet 202.

Figure 5:
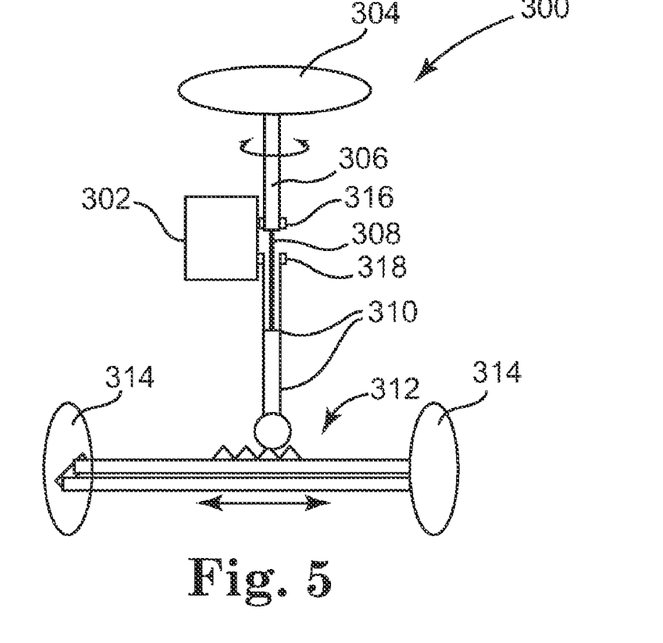
FIG. 5 is a diagram illustrating one embodiment of a power steering system including a sensor system.

FIG. 5 is a diagram illustrating one embodiment of a power steering system 300 including a sensor system 302. In one embodiment, sensor system 302 is similar to sensor system 20 of FIG. 1. In one embodiment, sensor system 302 is similar to torque and angle sensor system 200 of FIG. 4.

Power steering system 300 includes sensor system 302, a steering wheel 304, a first shaft 306, a torsion bar 308, a second shaft 310, a steering mechanism 312, and wheels 314. Steering wheel 304 is connected to first shaft 306 and configured to rotate clockwise and counter clockwise. First shaft 306 is connected to one end of torsion bar 308 and the other end of torsion bar 308 is connected to second shaft 310. First shaft 306, torsion bar 308, and second shaft 310 are also configured to rotate clockwise and counter clockwise. Wheels 314 are rotatably coupled to steering mechanism 312, which is coupled to second shaft 310, such that steering mechanism 312 moves back and forth and wheels 314 turn in response to rotating second shaft 310.

Sensor system 302 is coupled to first shaft 306 and second shaft 310. A first gear 316 is connected to first shaft 306 and a second gear 318 is connected to second shaft 310. Sensor system 302 is coupled to first shaft 306 via first gear 316 and to second shaft 310 via second gear 318.

In one embodiment, the magnet of sensor system 302 is coupled to first shaft 306 via first gear 316, and the first concentrator and the second concentrator are coupled to second shaft 310 via second gear 318. Where, second shaft 310 is connected to first shaft 306 via torsion bar 308 and system 300 senses torque between first shaft 306 and second shaft 310.

In operation, steering wheel 304 is turned clockwise or counter clockwise, which rotates first shaft 306 and first gear 316. Torsion bar 308 is made of a compliant material that twists, such that second shaft 310 and second gear 318 do not initially rotate. Sensor system 302 senses the rotation of first shaft 306 via first gear 316 and the non-rotation of second shaft 310 via second gear 318, and measures the torque between first shaft 306 and second shaft 310. Sensor system 302 outputs the measured torque value and power assist is provided to second shaft 310 and steering mechanism 312 to turn wheels 314 based on the output torque value.

Figure 6:
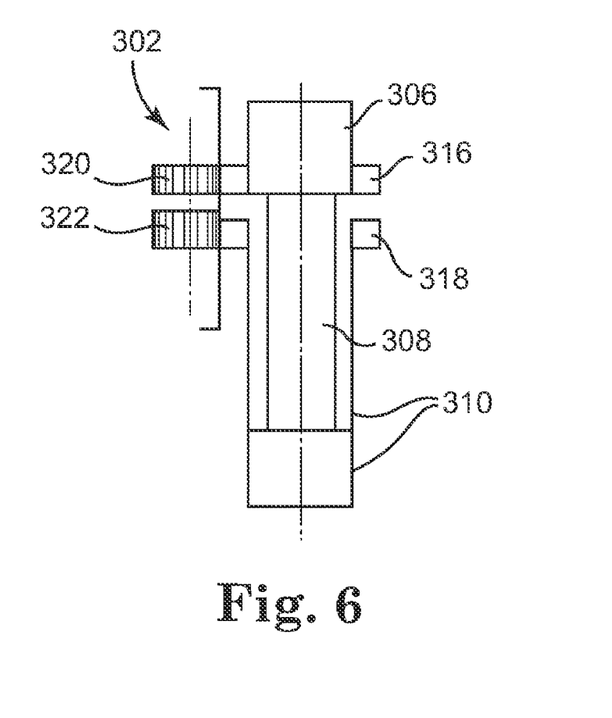
FIG. 6 is a diagram illustrating one embodiment of a sensor system coupled to a first shaft and a second shaft.

FIG. 6 is a diagram illustrating one embodiment of sensor system 302 coupled to first shaft 306 and second shaft 310. Sensor system 302 includes a top gear 320 and a bottom gear 322. Top gear 320 is connected to the magnet in sensor system 302. Bottom gear 322 is connected to the first concentrator and the second concentrator in sensor system 302.

First shaft 306 is connected to first gear 316 and second shaft 310 is connected to second gear 318, where first shaft 306 is connected to one end of torsion bar 308 and second shaft 310 is connected to the other end of torsion bar 308. The magnet in sensor system 302 is coupled to first shaft 306 via first gear 316 and top gear 320, where first gear 316 meshes with top gear 320. The first concentrator and the second concentrator in sensor system 302 are coupled to second shaft 310 via second gear 318 and bottom gear 322, where second gear 318 meshes with bottom gear 322.

The gear ratio of top gear 320 to first gear 316 and the gear ratio of bottom gear 322 to second gear 318 is chosen to increase the sensitivity of sensor system 302 to changes in the position of steering wheel 304. In one embodiment, the gear ratio of top gear 320 to first gear 316 is 4 to 1, such that rotation of first gear 316 creates a rotation that is 4 times larger in top gear 320 and the magnet. In one embodiment, the gear ratio of bottom gear 322 to second gear 318 is 4 to 1, such that rotation of second gear 318 creates a rotation that is 4 times larger in bottom gear 322 and the first and second concentrators.

In operation, steering wheel 304 is turned clockwise or counter clockwise, which rotates first shaft 306 and first gear 316. First gear 316 meshes with top gear 320 to rotate top gear 320 and the magnet in sensor system 302. Second gear 318 rotates as second shaft 310 rotates, where second gear 318 meshes with bottom gear 322 to rotate bottom gear 322 and the first and second concentrators in sensor system 302. Sensor system 302 senses and measures the angular displacement and/or torque between first shaft 306 and second shaft 310. In one embodiment, sensor system 302 senses and measures the angle of rotation of first shaft 306.

Figure 7:
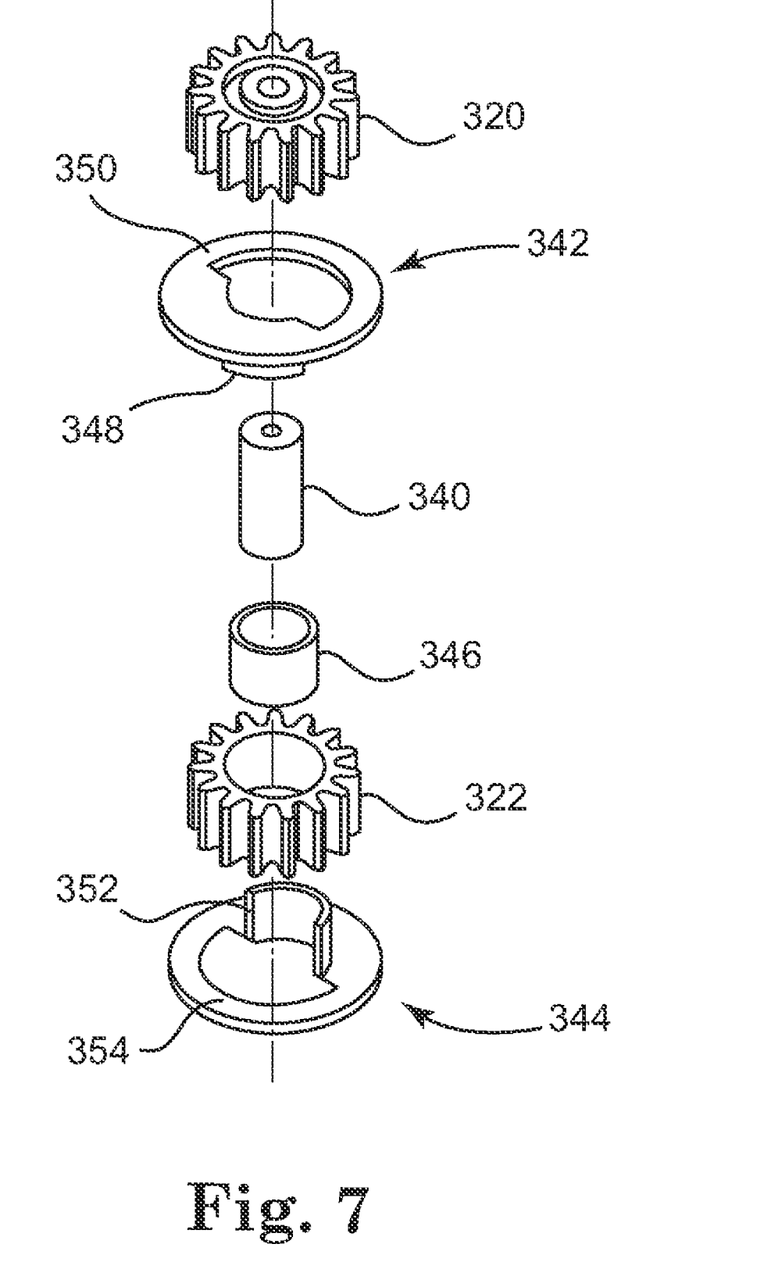
FIG. 7 is a diagram illustrating one embodiment of part of a sensor system, including a top gear and a bottom gear.

FIG. 7 is a diagram illustrating one embodiment of part of sensor system 302, including top gear 320 and bottom gear 322. Sensor system 302 includes top gear 320, bottom gear 322, magnet 340, first magnetic flux concentrator 342, second magnetic flux concentrator 344, and spacer 346. One end of magnet 340 is connected to top gear 320, such that magnet 340 rotates as top gear 320 rotates. Magnet 340 fits inside spacer 346, such that magnet 340 smoothly rotates inside spacer 346, which is made of a non-magnetic material. In one embodiment, magnet 340 is a single pole magnet. In other embodiments, sensor system 302 does not include spacer 346 and air is in the space maintained between magnet 340 and the first and second magnetic flux concentrators 342 and 344.

First concentrator 342 has a first partial hub 348 and a first circular flange 350 that is connected to first partial hub 348 along at least part of one edge of first partial hub 348. Second concentrator 344 has a second partial hub 352 and a second circular flange 354 that is connected to second partial hub 352 along at least part of one edge of second partial hub 352. First concentrator 342 and second concentrator 344 are aligned to form a central bore, where spacer 346 is situated in the central bore. First partial hub 348 and second partial hub 352 are spaced apart and situated on the outside of spacer 346 and fitted inside bottom gear 322. First concentrator 342 and second concentrator 344 are snugly fit inside bottom gear 322, such that each of first concentrator 342 and second concentrator 344 rotates as bottom gear 322 rotates.

Figure 8:
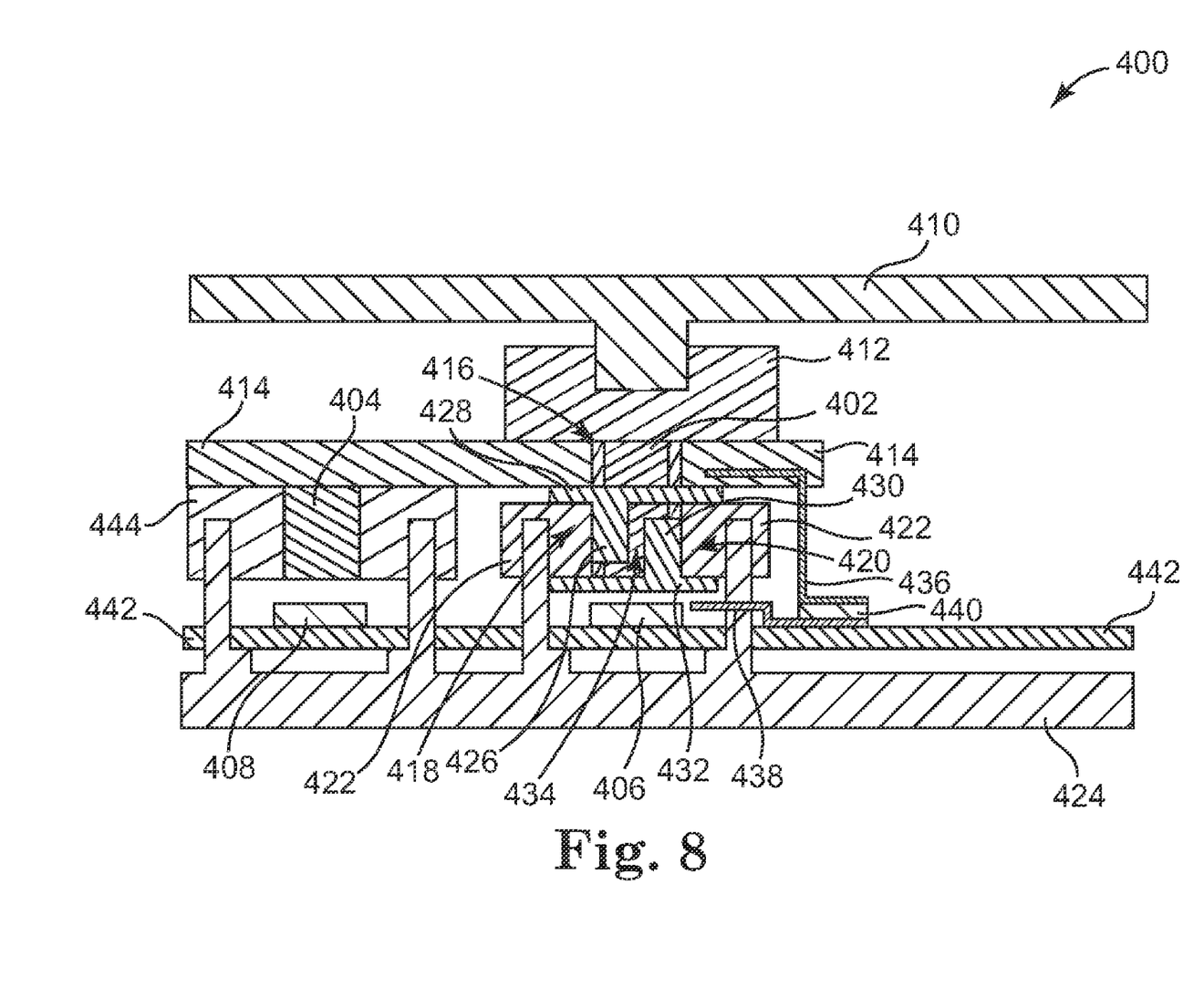
FIG. 8 is a diagram illustrating one embodiment of a torque and angle sensor system with redundancy.

FIG. 8 is a diagram illustrating one embodiment of a torque and angle sensor system 400 with redundancy. Sensor system 400 includes a first magnet 402, a second magnet 404, a first angle sensor 406, and a second angle sensor 408. First angle sensor 406 is situated adjacent one end of first magnet 402 to measure the angle of rotation of first magnet 402, and second angle sensor 408 is situated adjacent second magnet 404 to measure the angle of rotation of second magnet 404. This provides two angle measurements. Also, sensor system 400 has a torque sensor, similar to sensor system 20 of FIG. 1 and sensor system 200 of FIG. 4, and the difference between the angles measured by first angle sensor 406 and second angle sensor 408 can be used as a second measure of angular displacement and/or torque.

Sensor system 400 includes a top plate 410, a top gear 412, and a fixation plate 414. Top gear 412 is rotatably connected to top plate 410 and connected to first magnet 402, such that rotating top gear 412 rotates first magnet 402. Top gear 412 rotates between top plate 410 and fixation plate 414 and first magnet 402 is inserted through a hole at 416 in fixation plate 414. In one embodiment, top gear 412 and first magnet 402 are mechanically coupled to a shaft, such as first shaft 306 of power steering system 300 via first gear 316.

Sensor system 400 includes a first magnetic flux concentrator 418, a second magnetic flux concentrator 420, a bottom gear 422, and a base plate 424. First concentrator 418 has a first partial hub 426 that is connected to a first circular flange 428 along at least part of one edge of first partial hub 426. Second concentrator 420 has a second partial hub 430 that is connected to second circular flange 432 along at least part of one edge of second partial hub 430. First concentrator 418 and second concentrator 420 are aligned to form a central bore, where first partial hub 426 and second partial hub 430 are spaced apart at 434 and circumferentially aligned to form the bore.

First concentrator 418 is made of a magnetically conductive material having a high permeability. In one embodiment, first concentrator 418 is made of a ferromagnetic material. In one embodiment, first partial hub 426 is substantially semicircular. In one embodiment, first partial hub 426 is connected to first circular flange 428 continuously along the entire edge of first partial hub 426.

Second concentrator 420 is made of a magnetically conductive material having a high permeability. In one embodiment, second concentrator 420 is made of a ferromagnetic material. In one embodiment, second partial hub 430 is substantially semicircular. In one embodiment, second partial hub 430 is connected to second circular flange 432 continuously along the entire edge of second partial hub 430.

First magnet 402 is situated inside the bore. First magnet 402 is a cylindrical magnet having an axis that is aligned with the axis of the bore. First magnet 402 and top gear 412 rotate around the axis and bottom gear 422 rotates around the same axis. First magnet 402 is a diametrically magnetized cylindrical magnet, where the diametrically magnetized cylindrical magnet is magnetized perpendicular to length, such that the north and south poles are located on opposite sides of the cylinder. In one embodiment, first magnet 402 is a single pole magnet. In one embodiment, a spacer is situated inside the bore and between first magnet 402 and the first concentrator 418 and the second concentrator 420.

Bottom gear 422 is rotatably connected to base plate 424 and connected to first concentrator 418 and second concentrator 420 such that rotating bottom gear 422 rotates first concentrator 418 and second concentrator 420. Bottom gear 422 rotates between fixation plate 414 and base plate 424 around the axis of the bore, and first concentrator 418 and second concentrator 420 rotate around first magnet 402. In one embodiment, bottom gear 412 and first concentrator 418 and second concentrator 420 are mechanically coupled to a shaft, such as second shaft 310 of power steering system 300 via second gear 318.

Sensor system 400 includes a first magnetic flux guide 436, a second magnetic flux guide 438, and a magnetic sensing element 440. First guide 436 is situated adjacent first circular flange 428. Second guide 438 is situated adjacent second circular flange 432. Each of the first and second guides 436 and 438 is made of a magnetically conductive material having a high permeability. In one embodiment, first guide 436 is made of a ferromagnetic material. In one embodiment, second guide 438 is made of a ferromagnetic material.

Magnetic sensing element 440 is situated between first guide 436 and second guide 438. Magnetic sensing element 440 senses and measures magnetic flux flowing between first guide 436 and second guide 438. In one embodiment, magnetic sensing element 440 is a Hall effect sensing element.

Sensor system 400 includes a circuit board 442. First angle sensor 406 is situated adjacent one end of first magnet 402 on circuit board 442, which is situated on base plate 424. First angle sensor 406 senses and measures the angle of rotation of first magnet 402.

Sensor system 400 includes a second bottom gear 444 that is rotatably connected to base plate 424 and connected to second magnet 404, such that rotating second bottom gear 444 rotates second magnet 404. Second magnet 404 is a cylindrical diametrically magnetized magnet having an axis along the length of the cylinder. In one embodiment, second magnet 404 is a single pole magnet.

Second bottom gear 444 rotates between fixation plate 414 and base plate 424 around the axis of second magnet 404. Second angle sensor 408 is situated adjacent one end of second magnet 404 on circuit board 442, which is situated on base plate 424. Second angle sensor 408 senses and measures the angle of rotation of second magnet 404. In one embodiment, second bottom gear 444 and second magnet 404 are mechanically coupled to a shaft, such as second shaft 310 of power steering system 300 via second gear 318.

In operation, first magnet 402 rotates and provides magnetic flux that flows through first concentrator 418 and second concentrator 420. The magnetic flux flows through first partial hub 426 and first circular flange 428 and through second partial hub 430 and second circular flange 432. Also, some of the magnetic flux flows through first guide 436 and second guide 438 via first concentrator 418 and second concentrator 420. The amount of magnetic flux flowing between first guide 436 and second guide 438 is a function of the movement and position of first magnet 402 relative to first concentrator 418 and second concentrator 420. Magnetic sensing element 440 senses and measures magnetic flux flowing between first guide 436 and second guide 438 to measure angular displacement and torque. First angle sensor 406 senses magnetic flux and measures the angle of rotation of first magnet 402. Second angle sensor 408 senses magnetic flux and measures the angle of rotation of second magnet 404.

In one embodiment, top gear 412 and first magnet 402 are mechanically coupled to first shaft 306 of power steering system 300 via first gear 316, and bottom gear 422 and first concentrator 418 and second concentrator 420 are mechanically coupled to second shaft 310 of power steering system 300 via second gear 318. Also, second bottom gear 444 and second magnet 404 are mechanically coupled to second shaft 310 of power steering system 300 via second gear 318. Sensor system 400 senses and measures the torque between first shaft 306 and second shaft 310 via first magnet 402. Also, first angle sensor 406 senses and measures the angle of rotation of first magnet 402 and first shaft 306, and second angle sensor 408 senses and measures the angle of rotation of second magnet 404 and second shaft 310. This provides two angle measurements, where the difference between angles measured by first angle sensor 406 and second angle sensor 408 can be used as a second measure of torque between first shaft 306 and second shaft 310. Also, if bottom gear 422 and second bottom gear 444 are different sizes, the absolute angle can be measured over more than 360 degrees. Thus, sensor system 400 provides redundancy with two angle measurements and two torque measurements.

It is to be understood that the features of the various exemplary embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system comprising:
a first concentrator having a first partial hub;
a second concentrator having a second partial hub aligned with the first partial hub to form a cylindrical bore; and
a cylindrical magnet situated in the cylindrical bore, wherein the cylindrical magnet and the cylindrical bore have a common cylindrical axis and the first concentrator and the second concentrator guide magnetic flux from the cylindrical magnet to sense movement of the cylindrical magnet relative to the first concentrator and the second concentrator.

2. The system of claim 1, comprising:
a first guide configured to receive magnetic flux via the first concentrator;
a second guide configured to receive magnetic flux via the second concentrator; and
a magnetic sensing element situated between the first guide and the second guide.

3. The system of claim 2, wherein the magnetic sensing element includes a Hall effect sensing element.

4. The system of claim 1, wherein the first partial hub and the second partial hub are circumferentially aligned to form the bore.

5. The system of claim 1, wherein the cylindrical magnet is a diametrically magnetized cylindrical magnet and the axis of the diametrically magnetized cylindrical magnet is aligned with the axis of the cylindrical bore.

6. The system of claim 1, wherein the cylindrical magnet is coupled to a first shaft and the first concentrator and the second concentrator are coupled to a second shaft.

7. A system comprising:
a first concentrator having a first partial hub;
a second concentrator having a second partial hub aligned with the first partial hub to form a bore; and
a magnet situated in the bore, wherein the first concentrator and the second concentrator guide magnetic flux from the magnet to sense movement of the magnet relative to the first concentrator and the second concentrator and the magnet is coupled to a first shaft and the first concentrator and the second concentrator are coupled to a second shaft that is connected to the first shaft via a torsion bar and the system senses torque between the first shaft and the second shaft.

8. The system of claim 6, wherein the cylindrical magnet is coupled to the first shaft via a first gear and the first concentrator and the second concentrator are coupled to the second shaft via a second gear.

9. The system of claim 1, comprising:
an angle sensor situated adjacent the cylindrical magnet to measure the angle of rotation of the cylindrical magnet.

10. A system comprising:
a first concentrator having a first partial hub;
a second concentrator having a second partial hub aligned with the first partial hub to form a bore;
a first magnet situated in the bore;
a first guide configured to receive magnetic flux from the first magnet via the first concentrator;
a second guide configured to receive magnetic flux from the first magnet via the second concentrator;
a magnetic sensing element situated between the first guide and the second guide to measure torque; and
a first angle sensor situated adjacent the first magnet to measure rotation of the first magnet.

11. The system of claim 10, comprising:
a torsion bar;
a first shaft; and
a second shaft connected to the first shaft via the torsion bar, wherein the first magnet is coupled to the first shaft and the first concentrator and the second concentrator are coupled to the second shaft, and the system senses torque between the first shaft and the second shaft.

12. The system of claim 10, wherein the first magnet is a cylindrical magnet and the axis of the cylindrical magnet is aligned with the axis of the bore.

13. The system of claim 10, comprising:
a second magnet mechanically coupled to the first concentrator and the second concentrator; and
a second angle sensor situated adjacent the second magnet to measure an angle of rotation of the second magnet.

14. A method of sensing movement comprising:
aligning a first partial hub and a second partial hub to form a bore;
situating a magnet in the bore;
concentrating magnetic flux from the magnet via the first partial hub;
concentrating magnetic flux from the magnet via the second partial hub; and
guiding magnetic flux to sense movement of the magnet relative to the first partial hub and the second partial hub, wherein situating a magnet in the bore comprises:
aligning an axis of the magnet that is a diametrically magnetized cylindrical magnet with the axis of the bore.

15. The method of claim 14, comprising:
sensing magnetic flux via a magnetic sensing element to sense the movement of the magnet relative to the first partial hub and the second partial hub.

16. The method of claim 14, wherein aligning a first partial hub and a second partial hub comprises:
aligning circumferentially the first partial hub and the second partial hub to form the bore.

17. The method of claim 14, comprising;
coupling the magnet to a first shaft;
coupling the first partial hub and the second partial hub to a second shaft that is connected to the first shaft via a torsion bar; and
sensing torque between the first shaft and the second shaft.

18. The method of claim 17, wherein:
coupling the magnet to a first shaft comprises coupling the magnet to the first shaft via a first gear; and
coupling the first partial hub and the second partial hub to a second shaft comprises coupling the first partial hub and the second partial hub to the second shaft via a second gear.

19. The method of claim 14, comprising:
situating an angle sensor adjacent the magnet; and
measuring an angle of rotation of the magnet via the angle sensor.

20. A method of sensing movement comprising:
aligning a first partial hub and a second partial hub to form a bore;
situating a first magnet in the bore;
receiving magnetic flux at a first guide via the first partial hub;
receiving magnetic flux at a second guide via the second partial hub;
sensing magnetic flux via a magnetic sensing element situated between the first guide and the second guide;
situating a first angle sensor adjacent the first magnet; and
measuring the angle of rotation of the first magnet via the first angle sensor.

21. The method of claim 20, wherein situating a first magnet in the bore comprises:
aligning an axis of the first magnet that is a diametrically magnetized cylindrical magnet with the axis of the bore.

22. The method of claim 20, comprising:
situating a second angle sensor adjacent a second magnet that is mechanically coupled to the first partial hub and the second partial hub; and
measuring an angle of rotation of the second magnet via the second angle sensor.

* * * * *